(12) United States Patent
Yoshida et al.

(10) Patent No.: US 10,015,421 B2
(45) Date of Patent: Jul. 3, 2018

(54) IMAGING APPARATUS AND IMAGING SYSTEM FOR PERFORMING AD CONVERSION ON SIGNAL OUTPUT FROM PIXELS

(71) Applicant: CANON KABUSHIKI KAISHA, Tokyo (JP)

(72) Inventors: Daisuke Yoshida, Ebina (JP); Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/171,978

(22) Filed: Jun. 2, 2016

(65) Prior Publication Data

US 2016/0360129 A1    Dec. 8, 2016

(30) Foreign Application Priority Data

Jun. 5, 2015 (JP) ................ 2015-115239

(51) Int. Cl.
  *H04N 5/357*  (2011.01)
  *H04N 5/376*  (2011.01)
  *H04N 5/378*  (2011.01)

(52) U.S. Cl.
  CPC .......... *H04N 5/3575* (2013.01); *H04N 5/378* (2013.01); *H04N 5/3765* (2013.01)

(58) Field of Classification Search
  CPC ................. H04N 5/3575; H04N 5/3765
  See application file for complete search history.

(56) References Cited

U.S. PATENT DOCUMENTS

| | | | | |
|---|---|---|---|---|
| 9,258,505 B2* | 2/2016 | Ikeda | ........... | H04N 5/3696 |
| 2011/0037868 A1* | 2/2011 | Ota | ........... | H04N 5/357 |
| | | | | 348/222.1 |
| 2011/0080507 A1* | 4/2011 | Iwasa | ........... | H04N 5/378 |
| | | | | 348/302 |
| 2011/0242385 A1* | 10/2011 | Nishihara | ........... | H04N 5/378 |
| | | | | 348/308 |
| 2012/0008028 A1* | 1/2012 | Egawa | ........... | H04N 5/378 |
| | | | | 348/300 |
| 2014/0085743 A1* | 3/2014 | Jin | ........... | G11B 5/09 |
| | | | | 360/39 |

(Continued)

FOREIGN PATENT DOCUMENTS

| | | |
|---|---|---|
| JP | 2008-11284 A | 1/2008 |
| JP | 2010-103913 A | 5/2010 |

(Continued)

*Primary Examiner* — Cynthia Segura
(74) *Attorney, Agent, or Firm* — Canon U.S.A., Inc. IP Divison

(57) ABSTRACT

A first ramp signal having a potential which is changed with time in a first amplitude range in a first period and a second ramp signal in which a potential is changed with time in a second amplitude range which includes the first amplitude range and which has maximum amplitude larger than maximum amplitude of the first amplitude range and an amount of the change of the potential per unit time is the same as an amount of the change of the potential per unit time of the first ramp signal are generated, and comparison between an optical signal and the first ramp signal and comparison between the optical signal and the second ramp signal are performed in parallel.

9 Claims, 7 Drawing Sheets

(56) References Cited

U.S. PATENT DOCUMENTS

| | | | | |
|---|---|---|---|---|
| 2014/0313385 | A1* | 10/2014 | Sato | H04N 5/378 |
| | | | | 348/302 |
| 2014/0362271 | A1* | 12/2014 | Kanagawa | H04N 5/359 |
| | | | | 348/308 |
| 2015/0138413 | A1* | 5/2015 | Sato | H04N 5/378 |
| | | | | 348/302 |
| 2015/0162929 | A1* | 6/2015 | Shinozuka | H04N 5/378 |
| | | | | 348/294 |
| 2016/0205333 | A1* | 7/2016 | Shishido | H04N 5/378 |
| | | | | 348/308 |
| 2016/0366358 | A1* | 12/2016 | Shin | H04N 5/378 |
| 2017/0006206 | A1* | 1/2017 | Song | H04N 5/378 |
| 2017/0019621 | A1* | 1/2017 | Totsuka | H01L 27/14609 |

FOREIGN PATENT DOCUMENTS

| | | |
|---|---|---|
| JP | 2010-187239 A | 8/2010 |
| JP | 2010-252140 A | 11/2010 |
| JP | 2013-211832 A | 10/2013 |

\* cited by examiner

IMAGING APPARATUS AND IMAGING SYSTEM FOR PERFORMING AD CONVERSION ON SIGNAL OUTPUT FROM PIXELS

BACKGROUND OF THE INVENTION

Field of the Invention

The present invention relates to an imaging apparatus and an imaging system.

Description of the Related Art

Imaging apparatuses having an AD conversion unit which performs AD conversion on signals output from pixels have been widely used.

Japanese Patent Laid-Open No. 2010-103913 discloses a technique of performing AD conversion a plurality of times on a signal output from a pixel repeatedly using a ramp signal in the same amplitude and the same inclination from a ramp start potential to a ramp end potential. The same period of time is required for the AD conversion performed a plurality of times. According to Japanese Patent Laid-Open No. 2010-103913, this technique realizes an imaging apparatus having an improved noise characteristic.

Japanese Patent Laid-Open No. 2010-252140 discloses a technique of performing AD conversion a plurality of times on a signal output from a pixel using a plurality of ramp signals which have different amplitudes from a ramp start potential to a ramp end potential and which are offset by an arbitrary voltage at the same time point. According to Japanese Patent Laid-Open No. 2010-252140, this technique realizes reduction of a reading time and AD conversion with high bit accuracy.

SUMMARY OF THE INVENTION

According to an embodiment of the present invention, an imaging apparatus includes pixels which generate optical signals by performing photoelectric conversion on light and output the optical signals, a reference signal supply unit, a comparison unit, and a counter configured to generate a count signal by counting a clock signal. The reference signal supply unit generates a first ramp signal having a potential which is changed with time in a first amplitude range in a first period and a second ramp signal in which a potential is changed with time in a second amplitude range which includes the first amplitude range and which has maximum amplitude larger than maximum amplitude of the first amplitude range and an amount of the change of the potential per unit time is the same as an amount of the change of the potential per unit time of the first ramp signal. The comparison unit generates a first comparison result signal obtained as a result of first comparison in which the optical signal and the first ramp signal are compared with each other and a second comparison result signal obtained as a result of second comparison in which the optical signal and the second ramp signal are compared with each other. As digital signals based on the optical signal, the count signal at a timing when a level of the first comparison result signal is changed and the count signal at a timing when a level of the second comparison result signal is changed are generated. The comparison unit includes a first comparator which performs the first comparison so as to output the first comparison result signal and a second comparator which performs the second comparison so as to output the second comparison result signal. The first comparison is started in a period of time from when the second comparison is started to when the second comparison is terminated.

According to another embodiment of the present invention, an imaging apparatus includes pixels which generate optical signals by performing photoelectric conversion on light and output the optical signals, a reference signal supply unit, a comparison unit, and a counter configured to generate a count signal by counting a clock signal. The reference signal supply unit generates a first ramp signal having a potential which is changed with time in a first amplitude range in a first period and a second ramp signal in which a potential is changed with time in a second amplitude range which includes the first amplitude range and which has maximum amplitude larger than maximum amplitude of the first amplitude range and an amount of the change of the potential per unit time is the same as an amount of the change of the potential per unit time of the first ramp signal. The comparison unit generates a first comparison result signal obtained as a result of first comparison in which the optical signal and the first ramp signal are compared with each other and a second comparison result signal obtained as a result of second comparison in which the optical signal and the second ramp signal are compared with each other. As digital signals based on the optical signal, the count signal at a timing when a level of the first comparison result signal is changed and the count signal at a timing when a level of the second comparison result signal is changed are generated. The comparison unit outputs the first and second comparison result signals to the counter. The counter holds the count signal as a first count signal in accordance with the change of the level of the first comparison result signal, starts counting of the clock signal from the first count signal in the second comparison, and holds the count signal as a second count signal according to the change of the level of the second comparison result signal.

Further features of the present invention will become apparent from the following description of exemplary embodiments with reference to the attached drawings.

DESCRIPTION OF THE EMBODIMENTS

In the technique disclosed in Japanese Patent Laid-Open No. 2010-103913, a period of time required for the AD conversion is increased since the periods of time required for the plurality of AD conversion operations are the same as one another.

In the technique disclosed in Japanese Patent Laid-Open No. 2010-252140, the different ramp signals which are offset from one another by an arbitrary voltage at the same time point are used in the different AD conversion operations. Therefore, it is difficult to perform the plurality of AD conversion operations so that random noise is reduced.

Techniques described below relate to high speed AD conversion operations performed so that random noise is reduced.

Hereinafter, embodiments will be described with reference to the accompanying drawings. Note that, in the description below, expressions "amplitude is large" or "amplitude is small" may be used where appropriate when a signal level is described. The term "amplitude" indicates an amount of change from a reference signal value. For example, a potential (0 V, for example) of a signal A may be smaller than a potential (1 V, for example) of a signal B as a numerical value. In this case, if a signal level of a reference of the potentials of the signals A and B is larger than an intermediate potential of the signals A and B (3 V, for example), amplitude of the signal A is larger than amplitude of the signal B.

First Embodiment

Figure 1A:
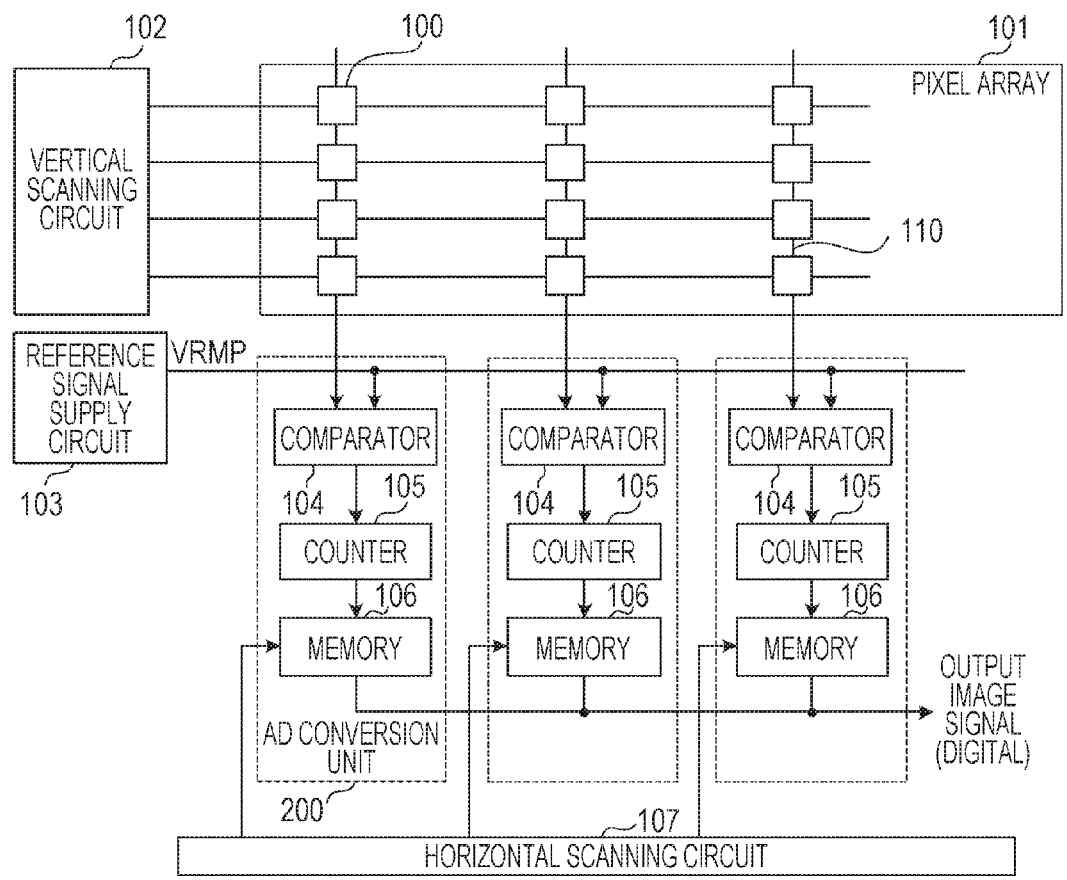
FIG. 1A is a diagram illustrating a configuration of an imaging apparatus.

FIG. 1A is a diagram illustrating an imaging apparatus according to a first embodiment.

A pixel array 101 includes a plurality of pixels 100 arranged in a plurality of rows and a plurality of columns. A vertical scanning circuit 102 performs vertical scanning by successively scanning the plurality of pixels 100 in the pixel array 101 on a row-by-row basis. The pixels 100 in each row are electrically connected to the vertical scanning circuit 102 through a control signal line. Furthermore, the plurality of pixels 100 in individual columns are electrically connected to vertical signal lines 110. The vertical signal lines 110 are arranged so as to correspond to the columns of the plurality of pixels 100 one by one. The vertical signal lines 110 are electrically connected to comparators 104 disposed outside the pixel array 101. Furthermore, the comparators 104 are electrically connected to a reference signal supply circuit 103. Signals output from the pixels 100 are supplied to the comparators 104 through the vertical signal lines 110. Furthermore, a ramp signal VRMP is supplied from the reference signal supply circuit 103 to the comparators 104. The reference signal supply circuit 103 is a reference signal supply unit which supplies the ramp signal VRMP. Each comparison unit of this embodiment includes one comparator 104.

The comparators 104 in the individual columns are electrically connected to respective counters 105. A clock signal is supplied from a timing generator, not illustrated, to the counters 105. Each of the counters 105 generates a count signal obtained by counting the clock signal.

The counters 105 in the individual columns are electrically connected to respective memories 106. The memories 106 in the individual columns store the count signals generated by the corresponding counters 105.

An AD conversion unit 200 includes one of the comparators 104, one of the counters 105, and one of the memories 106. A plurality of the AD conversion units 200 are disposed so as to correspond to the individual columns of the plurality of pixels 100.

A horizontal scanning circuit 107 performs horizontal scanning by successively scanning the memories 106 in the individual columns. By this, the count signals (image signals) stored in the memories 106 in the individual columns are output.

Figure 1B:
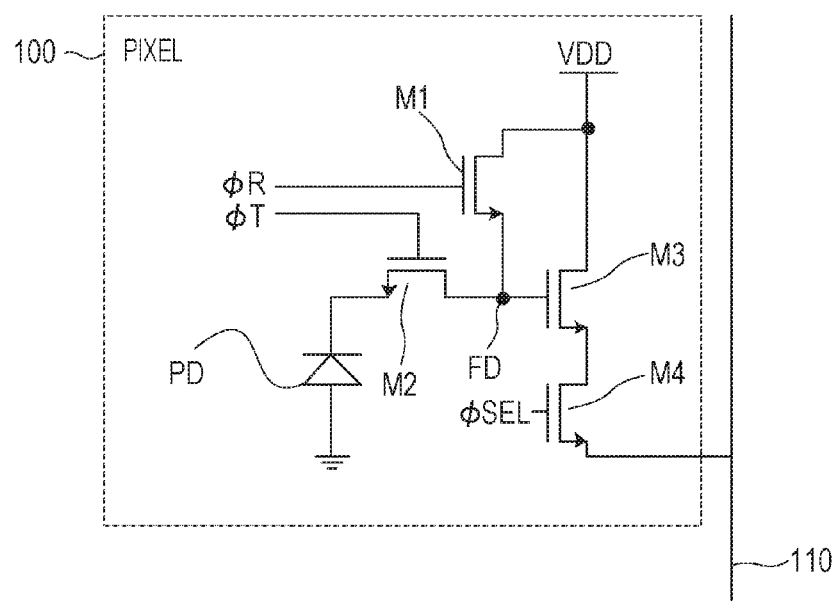
FIG. 1B is a diagram illustrating a configuration of a pixel.

FIG. 1B is a diagram illustrating a configuration of one of the pixels 100. The pixel 100 includes a photodiode PD, a reset transistor M1, a transfer transistor M2, an amplification transistor M3, and a selection transistor M4. The reset transistor M1 has a control node to which a signal φR is supplied from the vertical scanning circuit 102. The transfer transistor M2 has a control node to which a signal φT is supplied from the vertical scanning circuit 102. The selection transistor M4 has an input node to which a signal φSEL is supplied from the vertical scanning circuit 102. A power source voltage VDD is supplied to one of main nodes of the reset transistor M1 and one of main nodes of the amplification transistor M3. The other of the main nodes of the reset transistor M1, one of the main nodes of the transfer transistor M2, and a control node of the amplification transistor M3 are electrically connected to a node FD. The other of the main nodes of the transfer transistor M2 is electrically connected to the photodiode PD.

The other of the main nodes of the amplification transistor M3 is electrically connected to one of the main nodes of the selection transistor M4. The other of the main nodes of the selection transistor M4 is electrically connected to a corresponding one of the vertical signal lines 110.

Figure 2A:
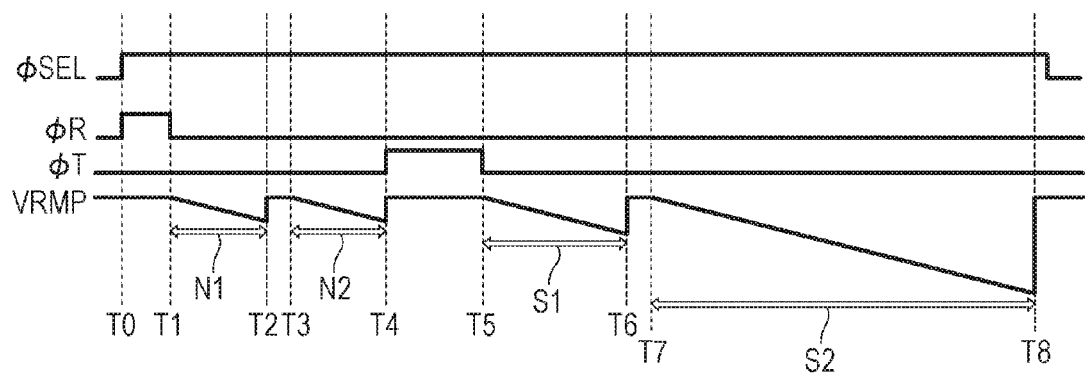
FIG. 2A is a diagram illustrating an operation of the imaging apparatus.
Figure 2B:
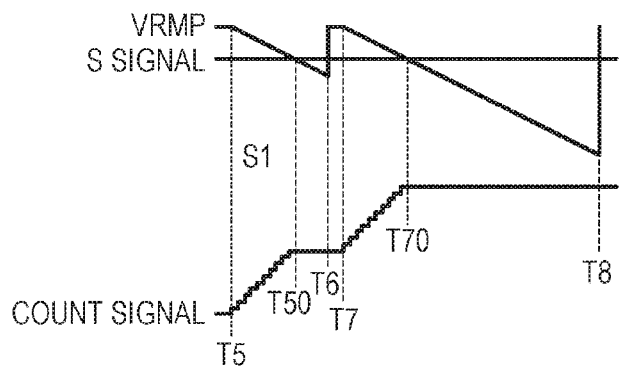
FIG. 2B is a diagram illustrating another operation of the imaging apparatus.
Figure 2C:
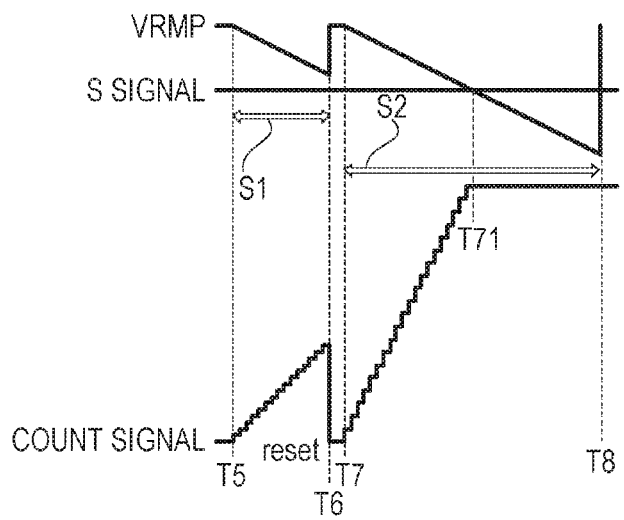
FIG. 2C is a diagram illustrating a further operation of the imaging apparatus.

FIG. 2A is a diagram illustrating an operation of the imaging apparatus illustrated in FIG. 1A and an operation of the pixel 100 illustrated in FIG. 1B. In FIGS. 2A to 2C, an operation associated with the pixels 100 in one row in the pixel array 101 is illustrated.

In a period of time before a time point T0, the vertical scanning circuit 102 brings the signals φSEL, φR, and φT into a low level (hereinafter referred to as "Lo"). Therefore, the selection transistor M4, the reset transistor M1, and the transfer transistor M2 to which the signals φSEL, φR, and φT are supplied, respectively, are in an off state.

At a time point T0, the vertical scanning circuit 102 brings the signals φSEL and φR into a high level (hereinafter referred to as "Hi"). By this, the selection transistor M4 and the reset transistor M1 are brought into an on state. Since the reset transistor M1 is turned on, the node FD is reset to a potential based on the power source voltage VDD. Since the selection transistor M4 is turned on, the amplification transistor M3 becomes capable of outputting a signal based on a potential of the node FD to the vertical signal line 110 through the selection transistor M4. The amplification transistor M3 constitutes a source follower circuit with a current source, not illustrated, which is electrically connected to the vertical signal line 110 and the power source voltage VDD.

At a time point T1, the vertical scanning circuit 102 brings the signal φR into a Lo level. By this, the reset transistor M1 is turned off. Accordingly, the reset of the node FD is cancelled. The amplification transistor M3 outputs a signal based on a potential of the node FD obtained after the reset is cancelled. This signal is referred to as an "N signal".

At the time point T1, the reference signal supply circuit 103 starts change of a potential of a ramp signal VRMP with time. The comparator 104 compares the ramp signal VRMP with the N signal output to the vertical signal lines 110. The comparator 104 outputs a comparison result signal indicating a result of the comparison between the ramp signal VRMP and the signal output to the vertical signal lines 110 to the counter 105.

The counter 105 starts counting of a clock signal at the time point T1. By this, a value of a count signal generated by the counter 105 is increased with time.

The magnitude relationship between a potential of the ramp signal VRMP and a potential of the N signal is reversed in a period from the time point T1 to a time point T2. At this timing, a value of the comparison result signal output from the comparator 104 is changed. The counter 105 holds a count value obtained at the time when the value of the comparison result signal is changed. This count signal is referred to as a "first N digital signal".

At the time point T2, the reference signal supply circuit 103 terminates the change of the potential of the ramp signal VRMP with time and resets the ramp signal VRMP to an initial value.

A period from the time point T1 to the time point T2 is a first N conversion period N1. The first N conversion period N1 corresponds to an AD conversion period in which the first N digital signal is generated.

At a time point T3, the reference signal supply circuit 103 starts change of the potential of the ramp signal VRMP with time again. The counter 105 starts counting of the clock signal in accordance with a value of the held first N digital signal.

In a period from the time point T3 to a time point T4, the value of the comparison result signal is changed again. The counter 105 holds a count value obtained at the time when the value of the comparison result signal is changed. This count signal is referred to as a "second N digital signal".

The period from the time point T3 to the time point T4 is a second N conversion period N2. The second N conversion period N2 corresponds to an AD conversion period in which the second N digital signal is generated. A length of the second N conversion period N2 is the same as that of the first N conversion period N1.

The memory 106 holds the second N digital signal held by the counter 105. The counter 105 resets the value of the count signal to an initial value.

At the time point T4, the vertical scanning circuit 102 brings the signal φT into a Hi state. By this, the transfer transistor M2 is turned on. Accordingly, transfer of electric charge accumulated in the photodiode PD to the node FD through the transfer transistor M2 is started.

At a time point T5, the vertical scanning circuit 102 brings the signal φT into a Lo level. By this, the transfer transistor M2 is turned off. Accordingly, the transfer of the electric charge from the photodiode PD to the node FD is terminated.

The amplification transistor M3 outputs a signal based on a potential of the node FD through the selection transistor M4 to the vertical signal line 110. The signal output from the amplification transistor M3 to the vertical signal line 110 is referred to as an "S signal". The S signal is an optical signal which is generated through photoelectric conversion and output by the pixel 100.

At the time point T5, the reference signal supply circuit 103 starts change of the potential of the ramp signal VRMP with time. The comparator 104 compares a potential of the S signal output from the vertical signal line 110 with the potential of the ramp signal VRMP. At the time point T5, the counter 105 starts counting of the clock signal from the initial value.

Hereinafter, a case where amplitude of the S signal is equal to or smaller than amplitude of the ramp signal VRMP obtained at a time point T6 and a case where the amplitude of the S signal is larger than the amplitude of the ramp signal VRMP obtained at the time point T6 will be separately described. An operation described below is one of characteristics of this embodiment.

FIG. 2B is a diagram illustrating the case where the amplitude of the S signal is equal to or smaller than the amplitude of the ramp signal VRMP obtained at the time point T6. Time points T5, T6, T7, and T8 correspond to the time points T5, T6, T7, and T8 illustrated in FIG. 2A.

In a period from the time point T5 to the time point T6, in the case where the amplitude of the S signal is smaller than the amplitude of the ramp signal VRMP obtained at the time point T6, the magnitude relationship between the potential of the S signal and the potential of the ramp signal VRMP is reversed at a time point T50, for example. In this case, a value of the comparison result signal is changed owing to the reverse of the magnitude relationship. The counter 105 holds a count signal obtained at the timing when the value of the comparison result signal is changed. This count signal is referred to as a "first S digital signal".

At the time point T6, the reference signal supply circuit 103 terminates the change of the potential of the ramp signal VRMP with time and resets the ramp signal VRMP to the initial value.

The period from the time point T5 to the time point T6 is a first S conversion period S1. The first S conversion period S1 is a first period in which the optical signal and a first ramp signal are compared with each other. In the first period, the comparator 104 performs first comparison which is the comparison between the first ramp signal and the optical signal.

At the time point T7, the reference signal supply circuit 103 starts change of the potential of the ramp signal VRMP with time again. A change amount of a potential of the ramp signal VRMP per unit time is the same as a change amount of a potential of the ramp signal VRMP per unit time in the period from the time point T5 to the time point T6. Specifically, a second ramp signal having a potential which is changed in a period from the time point T7 to the time point T8 has the same inclination as the first ramp signal. The counter 105 starts counting of the clock signal in accordance with a value of the held first S digital signal.

In the period from the time point T7 to the time point T8, the value of the comparison result signal is changed again at a time point T70, for example. The counter 105 holds a count value obtained at the time when the value of the comparison result signal is changed. This count signal is referred to as a "second S digital signal".

The period from the time point T7 to the time point T8 is a second S conversion period S2. The second S conversion period S2 is a second period in which the optical signal and the second ramp signal are compared with each other. The second S conversion period S2 is longer than the first S conversion period S1. Maximum amplitude of the second ramp signal (a potential at the time point T8) is larger than maximum amplitude of the first ramp signal (a potential at the time point T6). Furthermore, an amplitude range in which a potential of the second ramp signal is changed includes an amplitude range in which a potential of the first ramp signal is changed. In the second period, the comparator 104 performs second comparison which is the comparison between the second ramp signal and the optical signal.

The memory 106 stores the second S digital signal held by the counter 105. The counter 105 resets the value of the count signal to the initial value.

The horizontal scanning circuit 107 performs horizontal scanning so that the second S digital signals stored in the memories 106 in the individual columns are successively output from the memories 106 in the individual columns.

FIG. 2C is a diagram illustrating a case where the amplitude of the S signal is larger than the amplitude of the ramp signal VRMP. Time points T5, T6, T7, and T8 correspond to the time points T5, T6, T7, and T8 illustrated in FIG. 2A.

In a case where the amplitude of the S signal is larger than the amplitude of the ramp signal VRMP obtained at the time point T6, a value of the comparison result signal is not changed in a period from the time point T5 to the time point T6. In this case, the counter 105 terminates the counting of the clock signal, and in addition, resets a value of the count signal to the initial value at the time point T6.

At the time point T7, the reference signal supply circuit 103 starts change of the potential of the ramp signal VRMP with time again. The counter 105 starts counting of the clock signal from the initial value. Note that, in the case of FIG. 2C, count-up (1-bit shift) which is twice as fast as the counting of FIG. 2B is performed.

In the period from the time point T7 to the time point T8, the value of the comparison result signal is changed at a time point T71, for example. The counter 105 holds a count signal obtained at the time when the value of the comparison result signal is changed. This count signal is referred to as a "third S digital signal". Although the third S digital signal is obtained by performing counting only in a period from the time point T7 to the time point T71, the second S digital signal is obtained by performing counting by integrating a period from the time point T5 to the time point T50 and the period from the time point T7 to the time point T70. The third S digital signal is generated by one comparison operation performed by the comparator 104. The second S digital signal is obtained by adding digital signals generated by a plurality of comparison operations performed by the comparator 104 to one another.

The memory 106 stores the third S digital signal held by the counter 105. The counter 105 thereafter resets the value of the count signal to the initial value.

In the imaging apparatus of this embodiment, the first S conversion period S1 is shorter than the second S conversion period S2. Effects of this configuration will now be described.

In the operation illustrated in FIG. 2B, the second S digital signal is based on a result of AD conversion performed on the S signal a plurality of times. By performing the AD conversion a plurality of times, random noise of the second S digital signal may be reduced when compared with a digital signal obtained by performing AD conversion on the S signal only once. Therefore, the imaging apparatus of this embodiment has an effect of outputting a digital signal having reduced random noise.

The case where the amplitude of the S signal is larger than the amplitude of the ramp signal VRMP at the time point T6, which is a case where the operation illustrated in FIG. 2C is performed, corresponds to a case where the photodiode PD of the pixel 100 which outputs the S signal receives high-luminance light of a subject. In this case, most of noise included in the digital signal obtained by performing AD conversion on the S signal is optical shot noise, and the random noise is negligible. Therefore, in the imaging apparatus of this embodiment, the number of digital signals based on the S signal is 1 for a subject of high luminance in which the random noise is not distinct whereas the number of operations of generating digital signals based on the S signal is 2 for a subject of low luminance in which the random noise is distinct. Furthermore, in the imaging apparatus of this embodiment, an AD conversion period required for a first generation operation among the plurality of operations of generating the digital signal is shorter than an AD conversion period required for the other generation operation. By this, the imaging apparatus of this embodiment may reduce a period of time required for generation of a digital signal performed a plurality of times when compared with the case where the same AD conversion period is repeated a plurality of times as illustrated in the technique of Japanese Patent Laid-Open No. 2010-103913.

Furthermore, in one embodiment, to generate a digital signal having reduced random noise of the S signal while a period of time required for AD conversion performed a plurality of times is reduced, maximum amplitude of the first ramp signal is equal to or smaller than half of maximum amplitude of the second ramp signal and equal to or larger than eighth part of the maximum amplitude of the second ramp signal.

Furthermore, the second digital N signal output from the imaging apparatus is obtained by averaging fluctuation (random noise) included in the N signal. Accordingly, the AD conversion unit 200 may obtain the N signal including reduced random noise.

A signal processor, not illustrated, disposed outside the imaging apparatus obtains a difference between the second N digital signal and the second S digital signal. The signal processor generates an image using the difference. Note that the signal processor may correspond to an output signal processor 155 which will be described later in a fourth embodiment.

On the other hand, when the second S digital signal is not generated, the signal processor obtains a difference between the second N digital signal and the third S digital signal. The signal processor generates an image using the difference.

In this embodiment, the relationship among the first N conversion period N1, the second N conversion period N2, the first S conversion period S1, and the second S conversion period S2 is represented by "N1=N2<S1<S2". Since a noise signal has small amplitude, it is likely that random noise is remarkably detected. Therefore, as for the N signal, a digital signal is obtained a plurality of times using the ramp signal VRMP of the same amplitude range in AD conversion periods of the same length. By this, a digital signal having reduced random noise of the N signal may be obtained.

Note that, although the process of obtaining the difference between the second S digital signal or the third S digital signal and the second N digital signal is performed outside the imaging apparatus in this embodiment, this process may be performed inside the imaging apparatus. In this case, the imaging apparatus outputs the difference between the second S digital signal or the third S digital signal and the second N digital signal to the signal processor disposed outside the imaging apparatus. The signal processor generates an image using a signal of the difference output from the imaging apparatus.

Note that, although only one first S conversion period S1 is provided in this embodiment, the present invention is not limited to this configuration. A plurality of first S conversion periods S1 may be provided. If the number of first S conversion periods S1 is increased, the number of times the digital S signal is generated based on the S signal of low luminance is increased, and therefore, a digital signal, based on the S signal, having further reduced random noise may be generated.

Furthermore, although the two AD conversion periods for the N signal are provided, the number of the AD conversion periods may be larger than two. In this case, the number of times the digital N signal is generated based on the N signal is increased, and therefore, a digital signal, based on the N signal, having further reduced random noise may be generated.

Note that, as another example, an amplifier may be provided in an electric path between the vertical signal line 110 and the comparator 104. The amplifier supplies signals obtained by amplifying the N signal and the S signal which are output to the vertical signal line 110 to the comparator 104. In this case, the first N digital signal and the second N digital signal are based on a signal obtained by amplifying the N signal by the amplifier. Furthermore, the first S digital signal and the second S digital signal are based on a signal obtained by amplifying the S signal by the amplifier.

As another example, a correlated double sampling (CDS) circuit may be disposed in the electric path between the vertical signal line 110 and the comparator 104. The CDS circuit outputs a signal obtained by subtracting the N signal supplied to the vertical signal line 110 from the S signal supplied to the vertical signal line 110. In this case, main components of the first N digital signal and the second N digital signal are noise and offset caused by the comparator 104.

Furthermore, although the ramp signal VRMP has a potential which is changed in a slope shape, the potential may be changed in a step manner. Such a signal having a potential which is changed in a step manner is also a ramp signal having a potential changed with time.

Second Embodiment

Portions of an imaging apparatus according to a second embodiment which are different from the imaging apparatus of the first embodiment are mainly described.

Figure 3:
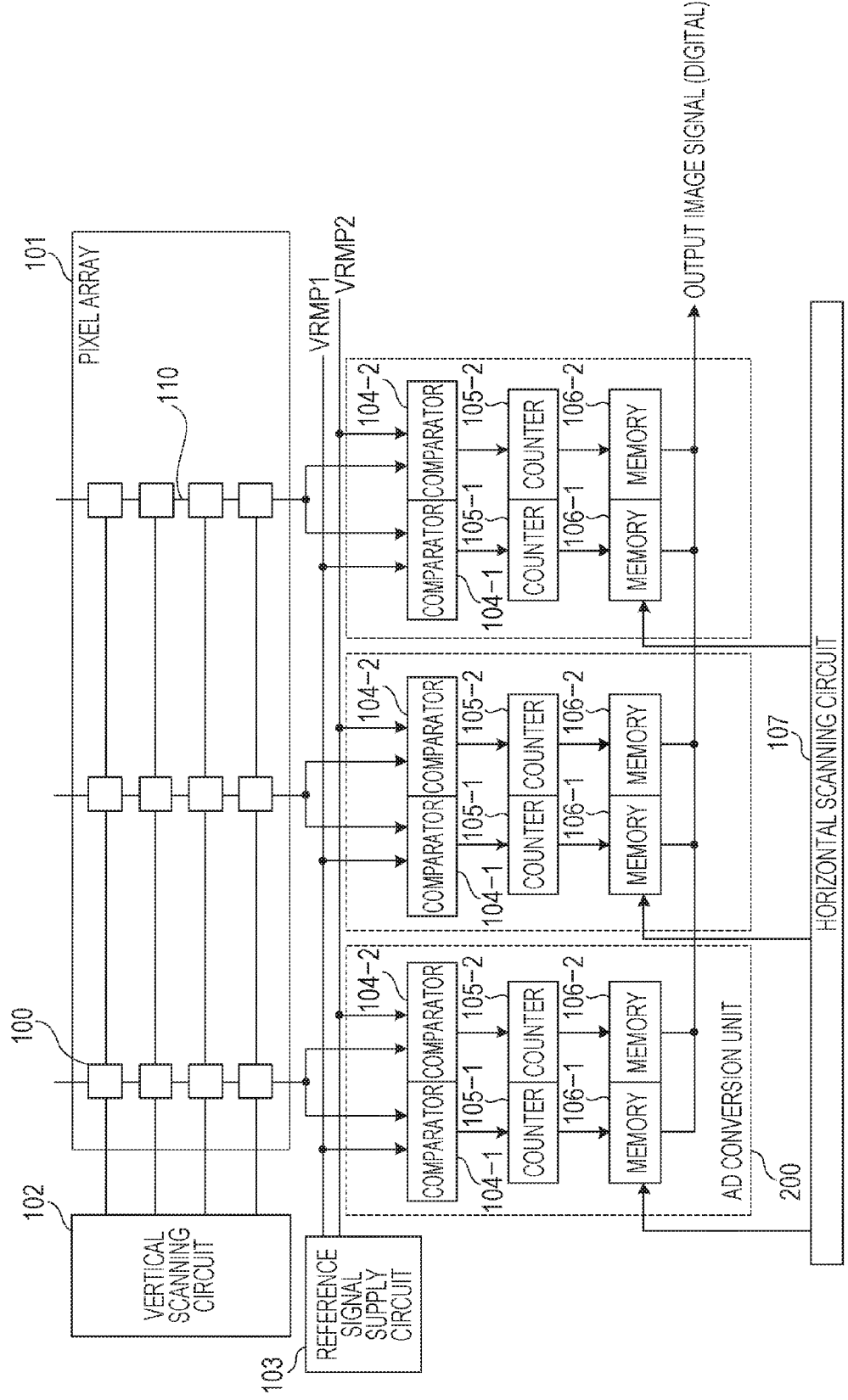
FIG. 3 is a diagram illustrating a configuration of an imaging apparatus.

FIG. 3 is a diagram illustrating a configuration of the imaging apparatus of this embodiment. In FIG. 3, components having functions the same as those illustrated in FIG. 1 are denoted by reference numerals the same as those of FIG. 1.

In the imaging apparatus of this embodiment, each of AD conversion units 200 in individual columns includes comparators 104-1 and 104-2, counters 105-1 and 105-2, and memories 106-1 and 106-2. Note that a term "comparator 104" indicates the comparator 104-1 or the comparator 104-2. Furthermore, a term "a plurality of comparators 104" indicates the comparator 104-1 and the comparator 104-2 in this embodiment. A notation system the same as that of the comparator 104 is employed in the counters 105-1 and 105-2 and the memories 106-1 and 106-2. The comparators 104-1 and 104-2 included in each of the AD conversion units 200 is electrically connected to a corresponding one of vertical signal lines 110. Each comparison unit of this embodiment includes the comparators 104-1 and 104-2. The comparator 104-2 is a first comparator which compares a ramp signal having a small amplitude range in which a potential is changed with an optical signal. The comparator 104-1 is a second comparator which compares a ramp signal having a large amplitude range in which a potential is changed with the optical signal.

The imaging apparatus of this embodiment performs AD conversion on one N signal output to the vertical signal line 110 using the comparators 104-1 and 104-2 in parallel. Furthermore, the imaging apparatus of this embodiment performs AD conversion on one S signal output to the vertical signal line 110 using the comparators 104-1 and 104-2 in parallel. In this embodiment, the plurality of comparators 104 have different lengths of an AD conversion period for one S signal.

Figure 4:
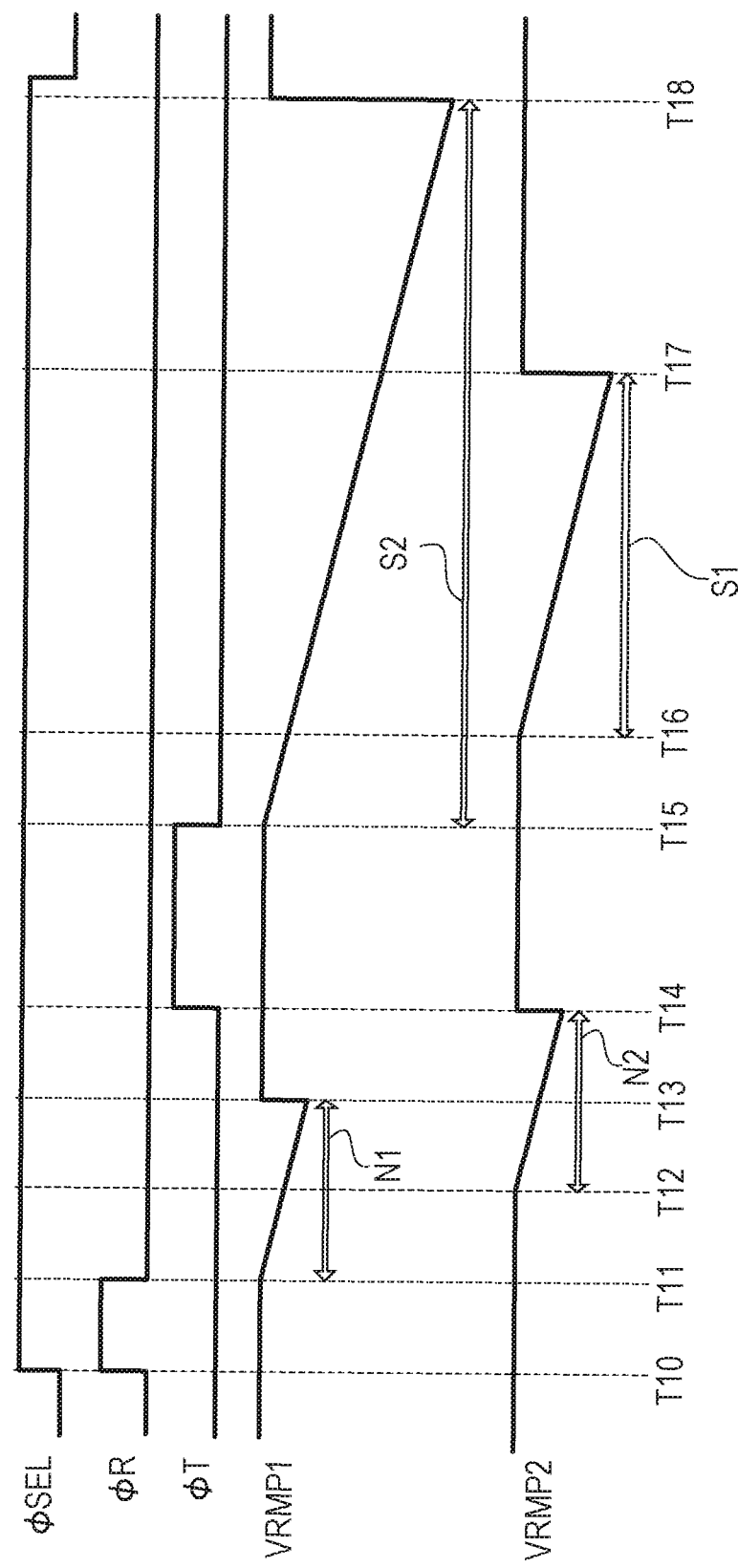
FIG. 4 is a diagram illustrating an operation of the imaging apparatus.

FIG. 4 is a diagram illustrating an operation of the imaging apparatus illustrated in FIG. 3. Signals φSEL, φR, and φT in this embodiment correspond to those of FIG. 1B.

An operation in a period before a time point T10 is the same as the operation in the period before the time point T0 in FIG. 2A.

An operation in a period from the time point T10 to a time point T11 is the same as an operation in the period from the time point T0 to the time point T1 in FIG. 2A.

At the time point T11, a reference signal supply circuit 103 starts change of a potential of a ramp signal VRMP1 with time.

At a time point T12, the reference signal supply circuit 103 starts change of a potential of a ramp signal VRMP2 with time.

The magnitude relationship between a potential of the ramp signal VRMP1 and a potential of an N signal is reversed in a period from the time point T11 to a time point T13. At this timing, a value of a comparison result signal output from the comparator 104-1 is changed. The counter 105-1 holds a count value obtained at the time when the value of the comparison result signal is changed. This count signal is referred to as a "first N digital signal".

The memory 106-1 stores the first N digital signal held by the counter 105-1.

Furthermore, the magnitude relationship between a potential of the ramp signal VRMP2 and the potential of the N signal is reversed in a period from the time point T12 to a time point T14. At this timing, a value of a comparison result signal output from the comparator 104-2 is changed. The counter 105-2 holds a count signal obtained at the time when the value of the comparison result signal is changed. This count signal is referred to as a "second N digital signal".

The memory 106-2 stores the second N digital signal held by the counter 105-2.

An operation in a period from the time point T14 to a time point T15 is the same as the operation in the period from the time point T4 to the time point T5 in FIG. 2A.

At the time point T15, the reference signal supply circuit 103 starts change of the potential of the ramp signal VRMP1 with time.

At a time point T16, the reference signal supply circuit 103 starts change of the potential of the ramp signal VRMP2 with time.

In a case where amplitude of the S signal at a time point T17 is equal to or smaller than amplitude of the ramp signal VRMP2, the value of the comparison result signal output from the comparator 104-2 is changed in a period from the time point T16 to the time point T17. In this case, the counter 105-2 holds the first S digital signal.

On the other hand, in a case where the amplitude of the S signal is larger than the amplitude of the ramp signal VRMP2 at the time point T17, the value of the comparison result signal output from the comparator 104-2 is not changed. Therefore, the counter 105-2 does not hold the first S digital signal.

In a period from the time point T15 to a time point T18, the value of the comparison result signal output from the comparator 104-1 is changed. The counter 105-1 holds a count signal obtained at the time when the value of the comparison result signal output from the comparator 104-1 is changed. The count signal corresponds to the third S digital signal described with reference to FIG. 2C.

In a case where the counter 105-1 holds the first S digital signal, the memory 106-1 stores the first S digital signal. The memory 106-2 stores the third S digital signal held by the counter 105-2.

A horizontal scanning circuit 107 performs horizontal scanning so that the first N digital signals and the first S digital signals are output from the memories 106-1 which store the first S digital signals and the second N digital signals and the third S digital signal are output from the memory 106-2.

A signal processor disposed outside the imaging apparatus generates a digital signal by adding the first N digital signal and the second N digital signal to each other. Furthermore, the signal processor generates a digital signal by adding the first S digital signal and the second S digital signal to each other in the AD conversion units 200 in which the first S digital signal is generated. The signal processor obtains a difference between the digital signal obtained by adding the first S digital signal and the second S digital signal to each other and the digital signal obtained by adding the first N digital signal and the second N digital signal to each other. The signal processor generates an image using the difference. On the other hand, in the AD conversion units 200 in which the first S digital signal is not generated, the signal processor obtains a difference between a digital signal obtained by adding the first N digital signal and the second N digital signal to each other and a digital signal which doubles the second S digital signal. The signal processor generates an image using the difference.

Note that, in this embodiment, a timing of start of the first S conversion period S1 and a timing of start of the second S conversion period S2 are shifted from each other. With this configuration, AD conversion may be performed in a state in which amounts of random noise included in the S signals are different from each other. Therefore, since the amount of the random noise of the first S digital signal and that of the third S digital signal are different from each other, a digital signal in which random noise is appropriately reduced by adding the first S digital signal and the third S digital signal to each other may be obtained. Furthermore, in this embodiment, the first S conversion period S1 and a portion of the second S conversion period S2 overlap with each other. By this, a period of time required for a plurality of AD conversion operations performed on the S signal may be reduced when compared with a configuration in which the first S conversion period S1 does not overlap with the second S conversion period S2. Accordingly, the imaging apparatus of this embodiment may realize reduction of the random noise of the S signal and reduction of the AD conversion period.

Furthermore, in this embodiment, a timing of start of the first N conversion period N1 and a timing of start of the second N conversion period N2 are shifted from each other. With this configuration, AD conversion may be performed in a state in which amounts of random noise included in the N signals are different from each other. Therefore, since the amount of the random noise of the first N digital signal and that of the second N digital signal are different from each other, a digital signal in which random noise is appropriately reduced by adding the first N digital signal and the second N digital signal to each other may be obtained. Furthermore, in this embodiment, a portion of the first N conversion period N1 and a portion of the second N conversion period N2 overlap with each other. By this, a period of time required for a plurality of AD conversion operations on the N signal may be reduced when compared with a configuration in which the first N conversion period N1 does not overlap with the second N conversion period N2. Accordingly, since the portion of the first N conversion period N1 and the portion of the second N conversion period N2 overlap with each other but the other portion of the first N conversion period N1 and the other portion of the second N conversion period N2 do not overlap with each other, the random noise of the N signal may be reduced and the AD conversion period may be reduced.

Third Embodiment

Portions of an imaging apparatus according to a third embodiment which are different from the imaging apparatus of the first embodiment are mainly described.

In the imaging apparatus of the first embodiment, each of the AD conversion units 200 in the individual columns includes a counter. The imaging apparatus of this embodiment includes a counter 108. The counter 108 is a common counter which supplies a common count signal to AD conversion units 200 in individual columns.

Figure 5A:
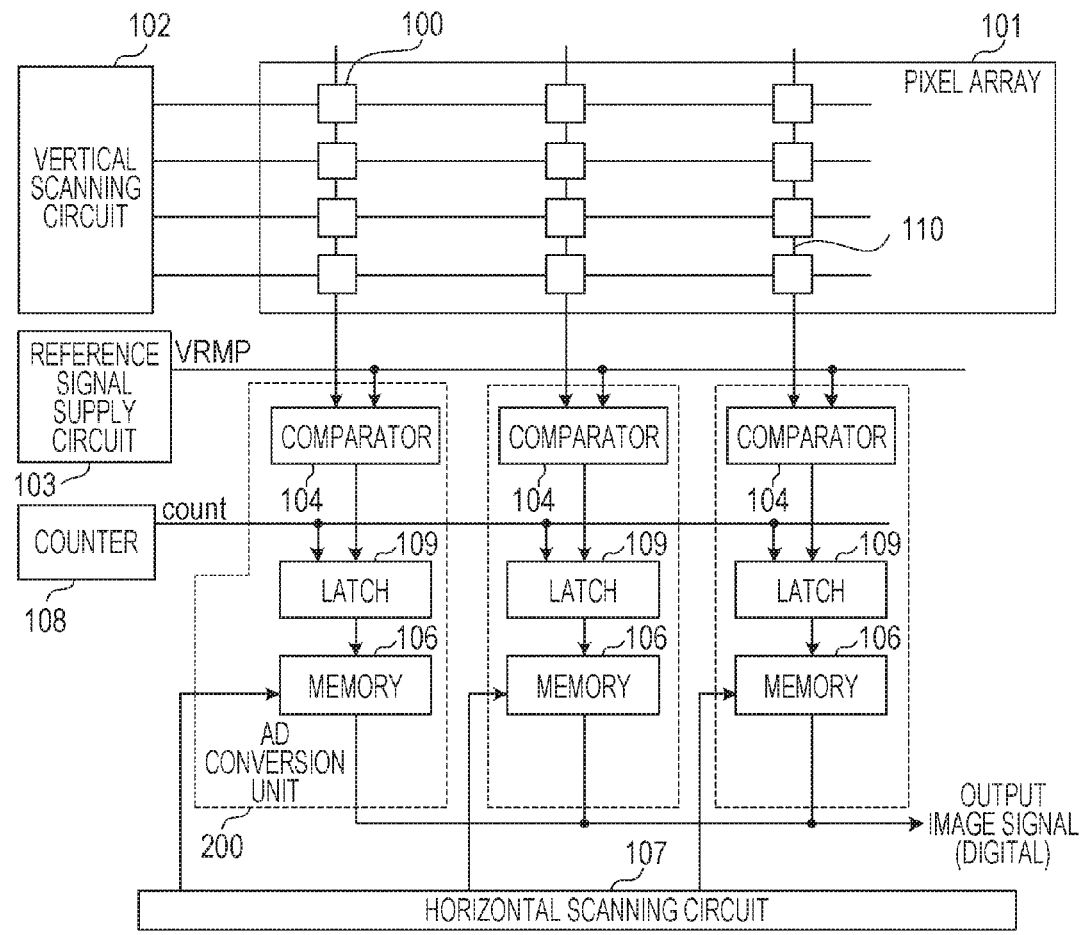
FIG. 5A is a diagram illustrating a configuration of an imaging apparatus.

FIG. 5A is a diagram illustrating a configuration of the imaging apparatus of this embodiment. In FIG. 5A, components having functions the same as those illustrated in FIG. 1A are denoted by reference numerals the same as those of FIG. 1A.

Each of AD conversion units 200 includes a comparator 104, a latch 109, and a memory 106.

The latch 109 receives a comparison result signal output from the corresponding comparator 104 and a count signal "count" output from the counter 108.

Figure 5B:
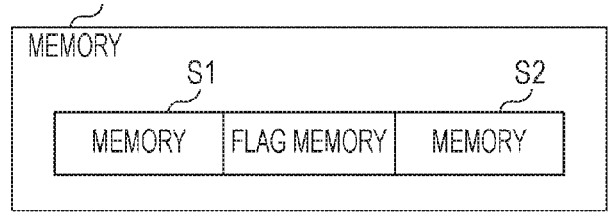
FIG. 5B is a diagram illustrating a configuration of a memory.

FIG. 5B is a diagram illustrating a configuration of the memory 106. The memory 106 includes an S1 memory, an S2 memory, and a flag memory.

Figure 6A:
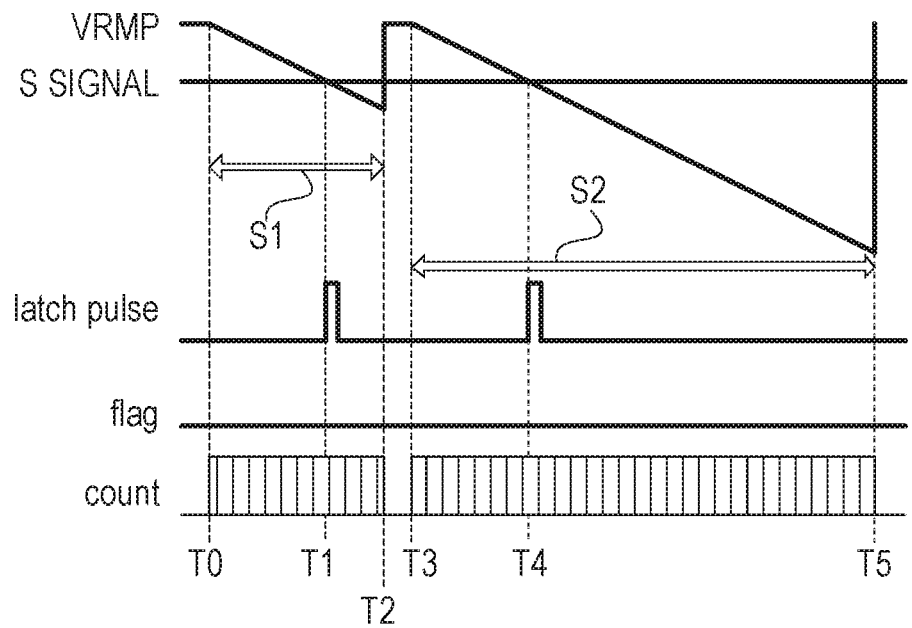
FIG. 6A is a diagram illustrating an operation of the imaging apparatus.

FIG. 6A is a diagram illustrating, as with the case of FIG. 2B, an operation performed when amplitude of an S signal is equal to or smaller than amplitude of a ramp signal VRMP at a time point T2. A signal "latch pulse" illustrated in FIG. 6A is output from the comparator 104 to the latch 109. A signal "flag" illustrated in FIG. 6A is output from the latch 109 to the memory 106.

In a period from a time point T0 to a time point T2, a value of the comparison result signal is changed. In response to the change, the comparator 104 brings the signal "latch pulse" into a Hi level from a Lo level and brings the signal "latch pulse" into the Lo level again. The latch 109 holds the count signal "count" which is supplied from the counter 108 at the timing when the signal "latch pulse" is brought into the Lo level from the Hi level. The S1 memory of the memory 106 stores the count signal "count" held by the latch 109. The count signal "count" stored in the S1 memory is a first S digital signal.

At the time point T2, the counter 108 resets the count signal "count" to an initial value.

Furthermore, in a period from a time point T3 to a time point T5, the value of the comparison result signal is changed. In response to the change, the comparator 104 brings the signal "latch pulse" into the Hi level from the Lo level and brings the signal "latch pulse" into the Lo level again. The latch 109 holds the count signal "count" which is supplied from the counter 108 at the timing when the signal "latch pulse" is brought into the Lo level from the Hi level. The S2 memory of the memory 106 stores the count signal "count" held by the latch 109. The count signal "count" stored in the S2 memory is a third S digital signal.

After the time point T2, the latch 109 maintains a signal "flag" to be a Lo level. The flag memory of the memory 106 obtains the signal "flag" in the Lo level.

In the operation of FIG. 6A, the signal "flag" is maintained to be the Lo level.

Figure 6B:
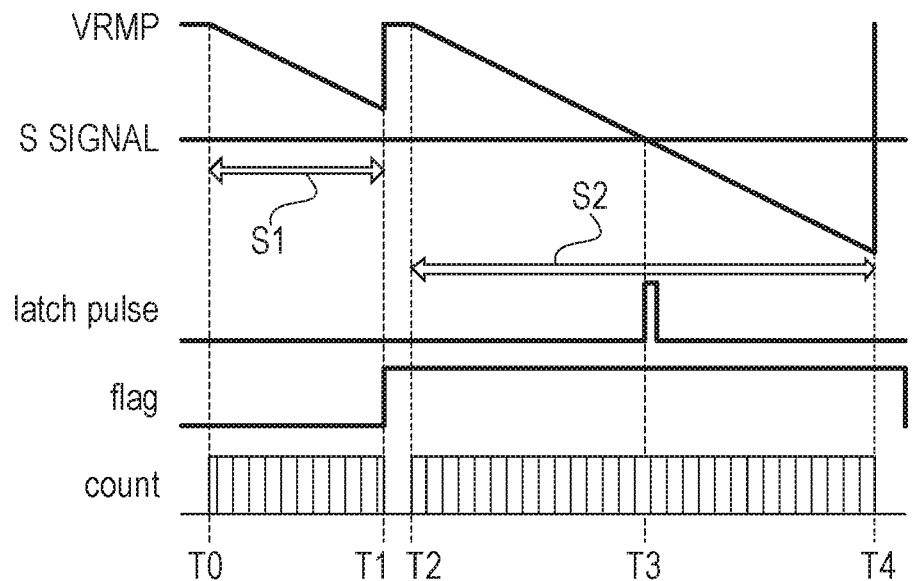
FIG. 6B is a diagram illustrating another operation of the imaging apparatus.

FIG. 6B is a diagram illustrating, as with the case of FIG. 2C, an operation performed when amplitude of the S signal is larger than amplitude of the ramp signal VRMP at the time point T2.

In FIG. 6B, in a period from a time point T0 to a time point T1, the value of the comparison result signal is not changed. Therefore, the signal "latch pulse" is maintained to be a Lo level. Accordingly, the latch 109 does not hold the count signal "count". Consequently, the S1 memory of the memory 106 does not store the first S digital signal. Furthermore, the latch 109 detects that the signal "latch pulse" is still in the Lo level at the time point T1 and brings the signal "flag" into a Hi level. The flag memory of the memory 106 obtains the signal "flag" in the Hi level.

An operation in a period from the time point T2 to a time point T4 in FIG. 6B is the same as the operation in the period from the time point T3 to the time point T5 in FIG. 6A.

A horizontal scanning circuit 107 performs horizontal scanning. By this, the memory 106 which stores the first S digital signal outputs the first S digital signal, the third S digital signal, and the signal "flag" in the Lo level. On the other hand, the memory 106 which does not store the first S digital signal outputs the third S digital signal and the signal "flag" in the Hi level.

A calculation unit, not illustrated, included in the imaging apparatus performs a calculation process below with reference to a level of the signal "flag". The first S digital signal stored in the S1 memory is denoted by "D_S1", the third S digital signal stored in the S2 memory is denoted by "D_S2", and an output of the calculation unit is denoted by "Dout". Hereinafter, it is assumed that a Lo level of the signal "flag" is represented by a value 0 and a Hi level thereof is represented by a value 1.

Case of "flag=0"

$Dout=D\_S1+D\_S2$

Case of "flag=1"

$Dout=D\_S2\times 2$

Specifically, in a case where the signal "flag" is in a Lo level, the calculation unit outputs a value obtained by adding results of AD conversion performed twice to each other.

On the other hand, in a case where the signal "flag" is in a Hi level, the calculation unit outputs a value obtained by doubling the third S digital signal.

By this, a digital signal obtained by adding a plurality of digital signals based on the S signal may be obtained from the AD conversion units 200 in which the signal "flag" is in the Lo level. Furthermore, a digital signal based on the S signal may be obtained from the AD conversion units 200 in which the signal "flag" is in the Hi level. In this way, when the calculation unit included in the imaging apparatus performs the calculation process, the signal processor disposed outside the imaging apparatus may process a signal output from the calculation unit without change of a process depending on a level of the signal "flag".

Figure 5C:
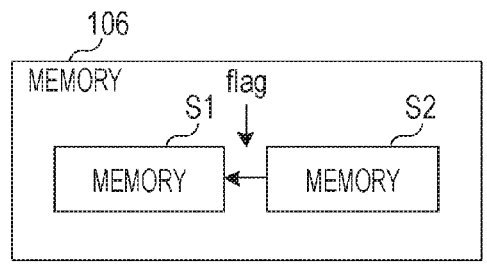
FIG. 5C is a diagram illustrating another configuration of the memory.

Note that a configuration of the memory 106 in this embodiment is not limited to that illustrated in FIG. 5B. FIG. 5C is a diagram illustrating another configuration of the memory 106.

The memory 106 includes an S1 memory which stores a first S digital signal and an S2 memory which stores a third S digital signal. The memory 106 of the configuration illustrated in FIG. 5C does not include a flag memory. The memory 106 of the configuration illustrated in FIG. 5C refers to a level of the signal "flag". When the signal "flag" is in a Hi level, the memory 106 copies the third S digital signal stored in the S2 memory to the S1 memory. The calculation unit performs the following process.

$Dout=D\_S1+D\_S2$

Accordingly, as with the case of FIG. 5B, the calculation unit outputs a value obtained by adding results of AD conversion performed twice in the operation illustrated in FIG. 6A and outputs a value obtained by doubling the third digital S signal in the operation illustrated in FIG. 6B. If the configuration illustrated in FIG. 5C is employed, the flag memory may be omitted, and accordingly, an area of the memory 106 may be reduced when compared with the configuration illustrated in FIG. 5B. Furthermore, if the configuration illustrated in FIG. 5C is employed, transfer of the signal "flag" to the calculation unit may be omitted, and accordingly, an amount of digital data read by the horizontal scanning may be reduced when compared with the configuration illustrated in FIG. 5B.

Fourth Embodiment

A fourth embodiment relates to an imaging system including one of the imaging apparatuses according to the first to third embodiments.

Figure 7:
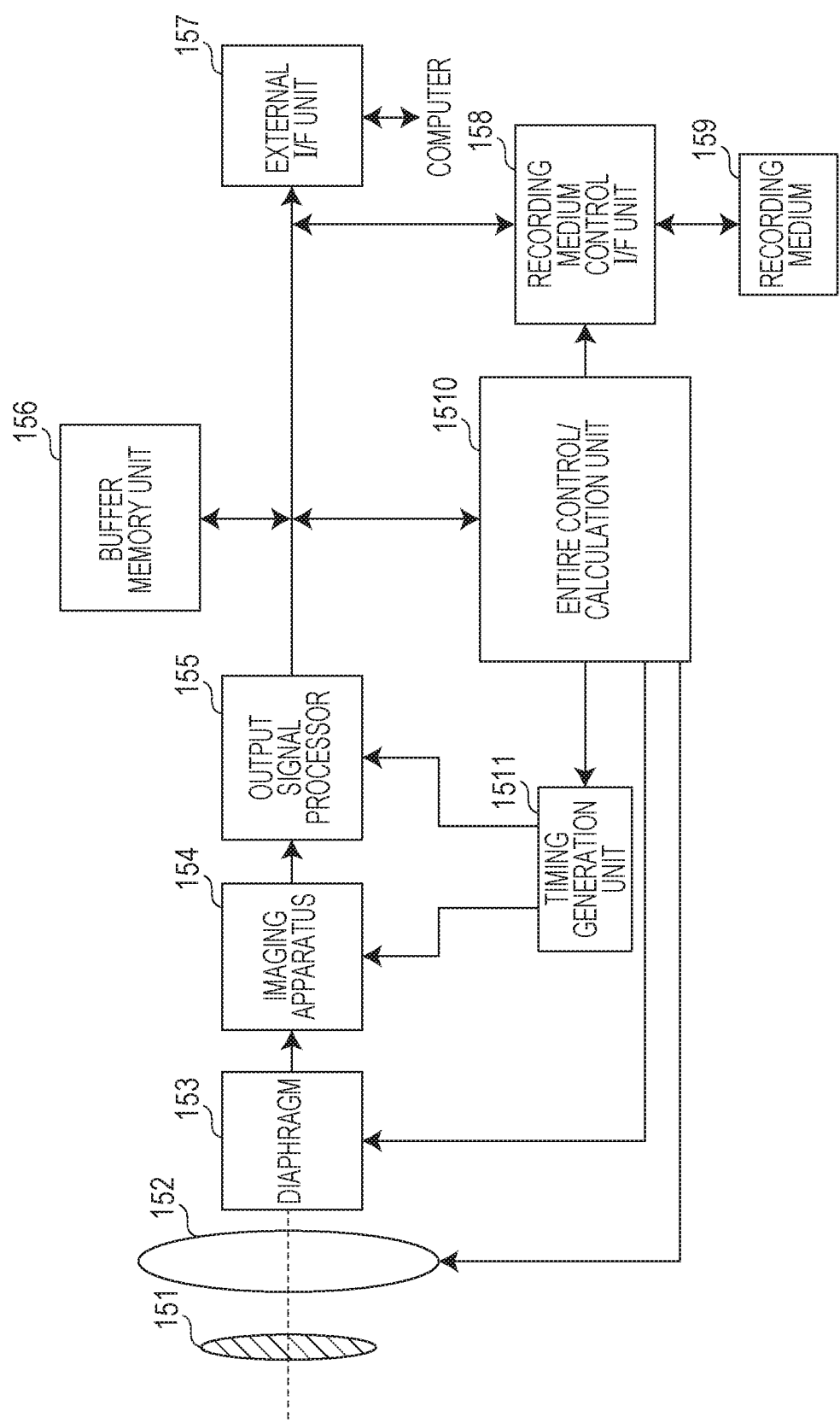
FIG. 7 is a diagram illustrating a configuration of an imaging system.

Examples of the imaging system include a digital still camera, a digital camcorder, and a surveillance camera. FIG. 7 is a diagram schematically illustrating a digital still camera serving as the imaging system including the imaging apparatus.

The imaging system illustrated in FIG. 7 includes a barrier 151 which protects a lens, a lens 152 which forms an optical image of a subject on an imaging apparatus 154, and a diaphragm 153 which changes an amount of light which passes the lens 152. The lens 152 and the diaphragm 153 constitute an optical system which collects light into the imaging apparatus 154. The imaging system illustrated in FIG. 7 further includes an output signal processor 155 which processes a signal output from the imaging apparatus 154. The output signal processor 155 performs an operation of performing various correction processes and compression processes on a signal where appropriate before outputting the signal.

The imaging system illustrated in FIG. 7 further includes a buffer memory unit 156 which temporarily stores image data and an external interface unit 157 used to communicate with an external computer and the like. The imaging system further includes a detachable recording medium 159, such as a semiconductor memory, used to record or read imaging data and a storage medium control interface unit 158 used to perform recording and reading on the recording medium 159. The solid-state imaging system further includes an entire control/calculation unit 1510 which controls various calculations and the entire digital still camera and a timing generation unit 1511 which outputs various timing signals to the imaging apparatus 154 and the output signal processor 155. Here, the timing signals and the like may be externally input, and the imaging system at least includes the imaging apparatus 154 and the output signal processor 155 which processes a signal output from the imaging apparatus 154.

The output signal processor 155 may correspond to the signal processor disposed outside the imaging apparatus according to the first to third embodiments.

As described above, the imaging system of this embodiment may perform an imaging operation using the imaging apparatus 154.

Note that the foregoing embodiments are embodied examples of the present invention, and therefore, the technical scope of the present invention is not limited by the embodiments. Specifically, the present invention may be embodied in various forms without departing from the technical scope and main features. Furthermore, the present invention may be embodied by combining the foregoing embodiments in various combinations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-115239, filed Jun. 5, 2015, which is hereby incorporated by reference herein in its entirety.

What is claimed is:

1. An imaging apparatus comprising:
pixels each of which outputs an optical signal by performing photoelectric conversion on light;
a reference signal supply circuit; and
an AD convertor including a first comparator and a second comparator, wherein
the reference signal supply circuit supplies, a first ramp signal to the first comparator in a first period and supplies a second ramp signal to the second comparator in a second period which includes the first period,
the reference signal supply circuit changes a potential of the first ramp signal with time in a first amplitude range,
a change of the potential of the first ramp signal starts at a beginning of the first period and continues at least to an end of the first period, the beginning of the first period being included within the second period,
the reference signal supply circuit changes a potential of the second ramp signal with time in a second amplitude range which includes the first amplitude range and which has a maximum amplitude larger than a maximum amplitude of the first amplitude range,
a change of the potential of the second ramp signal starts at a beginning of the second period and continues at least to an end of the second period,
during the second period, the optical signal is continuously input to both of the first comparator and the second comparator from the beginning of the second period and until the end of the second period,
an amount of the change of the potential per unit time of the second ramp signal is the same as an amount of the change of the potential per unit time of the first ramp signal,
in the first period, the AD convertor generates a first digital signal based on the optical signal, by comparing the optical signal with the first ramp signal, and
in the second period, the AD convertor generates a second digital signal based on the optical signal which is used or to be used for generating the first digital signal, by comparing the optical signal with the second ramp signal.

2. The imaging apparatus according to claim 1, wherein
in the first period, the first comparator generates a first comparison result signal obtained as a result of first comparison in which the optical signal and the first ramp signal are compared with each other, and
in the second period, the second comparator generates a second comparison result signal obtained as a result of second comparison in which the optical signal which is used or to be used for generating the first comparison result signal and the second ramp signal are compared with each other.

3. The imaging apparatus according to claim 2, wherein the maximum amplitude of the first amplitude range is equal to or smaller than half of the maximum amplitude of the second amplitude range, and
the maximum amplitude of the first amplitude range is equal to or larger than eighth part of the maximum amplitude of the second amplitude range.

4. The imaging apparatus according to claim 2, further comprising:
a counter configured to generate a count signal by counting a clock signal, and
a memory configured to receive the count signal, store the count signal as a first count signal according to a change of a level of the first comparison result signal, and store the count signal as a second count signal according to a change of a level of the second comparison result signal.

5. The imaging apparatus according to claim 4, comprising:
a plurality of pixels including the pixel arranged in a plurality of columns;
a plurality of AD convertors including the AD convertor arranged correspondingly to the plurality of columns of the pixels; and
a calculation unit,
wherein each of the plurality of the AD convertors includes the first comparator, the second comparator and the memory,
among the plurality of the AD convertors, the memory included in a first AD convertors in which the level of the first comparison result signal is not changed in the first comparison and the level of the second comparison result signal is changed in the second comparison does not store the first count signal but stores the second count signal,
among the plurality of the AD convertors, the memory included in a second AD convertor in which the level of the first comparison result signal is changed in the first comparison and the level of the second comparison result signal is changed in the second comparison stores the first count signal and the second count signal,
the calculation unit amplifies the second count signal stored in the memory of the first AD convertor, and
the calculation unit adds the first count signal and the second count signal to each other which are stored in the memory of the second AD convertor.

6. The imaging apparatus according to claim 4, comprising:
a plurality of pixels including the pixel arranged in a plurality of columns;
a plurality of AD convertors including the AD convertor arranged correspondingly to the plurality of columns of the pixels; and a calculation unit, wherein each of the plurality of the AD convertors includes the first comparator, the second comparator and the memory, among the plurality of the AD convertors, the memory included in a first AD convertor in which the level of the first comparison result signal is not changed in the first comparison and the level of the second comparison result signal is changed in the second comparison does not store the first count signal but stores the second count signal, among the plurality of the AD convertors, the memory included in a second AD convertor in which the level of the first comparison result signal is changed in the first comparison and the level of the second comparison result signal is changed in the second comparison stores the first count signal and the second count signal, the memory of the first AD convertor generates a plurality of the second count signals by copying the second count signal, the calculation unit adds the plurality of the second count signals generated by the memory of the first AD convertor to one another, and the calculation unit adds the first count signal and the second count signal to each other which are stored in the memory of the second AD convertor.

7. The imaging apparatus according to claim 1, wherein the maximum amplitude of the first amplitude range is equal to or smaller than half of the maximum amplitude of the second amplitude range, and the maximum amplitude of the first amplitude range is equal to or larger than eighth part of the maximum amplitude of the second amplitude range.

8. The imaging apparatus according to claim 1, further comprising:

an amplifier configured to amplify the optical signal to output an amplified optical signal and disposed in a path between the pixel and the AD convertor, wherein the first and second convertors compares the amplified optical signal with the first and second ramp signals, respectively.

9. An imaging system comprising:

the imaging apparatus according to claim 1; and a signal processor configured to generate an image by processing a signal output from the imaging apparatus.

* * * * *